United States Patent [19]

Grinberg et al.

[11] Patent Number: 4,728,174

[45] Date of Patent: Mar. 1, 1988

[54] ELECTRON BEAM ADDRESSED LIQUID CRYSTAL LIGHT VALVE

[75] Inventors: Jan Grinberg, Los Angeles; Nobuo J. Koda, Vista; Phillip G. Reif, Chatsworth; William P. Bleha, Jr., Carlsbad; Murray S. Welkowsky, Chatsworth; Arno G. Ledebuhr, Plesanton, all of Calif.

[73] Assignee: Hughes Aircraft Company, Los Angeles, Calif.

[21] Appl. No.: 927,580

[22] Filed: Nov. 6, 1986

[51] Int. Cl.$^4$ .............................................. G02F 1/13
[52] U.S. Cl. ........................... 350/334; 350/331 R; 350/332; 350/339 R
[58] Field of Search ............ 350/336, 339 R, 342, 350/334, 331 R, 332

[56] References Cited

U.S. PATENT DOCUMENTS

| | | | |
|---|---|---|---|
| 3,499,112 | 3/1970 | Heilmeier et al. | 350/331 R X |
| 3,600,060 | 8/1971 | Churchill et al. | 350/351 X |
| 3,643,021 | 2/1972 | De Blance | 350/331 R X |
| 4,093,357 | 6/1978 | Jacobson et al. | 350/342 X |
| 4,239,348 | 12/1980 | Grinberg et al. | 350/334 X |
| 4,387,964 | 6/1983 | Arrazola et al. | 350/334 X |

OTHER PUBLICATIONS

Haven, D., "Electron-Beam Addressed Liquid Crystal Light Valve," *IEEE Transactions on Electron Devices*, vol. ED-30, No. 5 (May 1983) pp. 489-492.

Primary Examiner—Stanley D. Miller
Assistant Examiner—Richard F. Gallivan
Attorney, Agent, or Firm—Wanda K. Denson-Low; A. W. Karambelas

[57] ABSTRACT

An electron beam addressed crystal light valve (LCLV) produces an AC voltage across a liquid crystal layer from a single polarity electron beam, and exhibits very high resolution. A mirror and a thin layer of partially conductive material are deposited on a support membrane on the electron beam side of the liquid crystal. The partially conductive layer is divided into a series of pixel elements by a conductive matrix which faces the electron beam. Electrons from the beam are absorbed by the partially conductive layer to establish a negative voltage across the liquid crystal, and then flow out to the conductive matrix to produce an AC voltage prior to the next electron beam scan. The conductive matrix is connected in circuit with a transparent electrode which provides a voltage reference on the readout side of the liquid crystal. The elements of the device are designed with electrical parameters that produce a discharge rate from the partially conductive layer fast enough to complete an AC cycle between successive electron beam scans, but slow enough for the liquid crystal to respond and produce an image.

19 Claims, 5 Drawing Figures

ELECTRON BEAM ADDRESSED LIQUID CRYSTAL LIGHT VALVE

BACKGROUND OF THE INVENTION

1. Field of the Invention

This invention relates to liquid crystal light valves which modulate readout optical beam in response to an input electrical beam pattern.

2. Description of the Prior Art

Liquid crystal light valves (LCLVs) generally employ twisted nematic liquid crystal cells in which the liquid crystal molecules are ordered such that plane-polarized light passing through the cell is rotated 90°. When sufficient voltages are applied to particular areas of the cell, the molecular axes of the liquid crystal molecules in these areas orient themselves parallel to the applied electric field. Polarized light can then pass through these areas of the cell essentially unchanged, while light is blocked in the areas of the liquid crystal to which no field is applied. Optical images can thus be produced by the spatial voltage pattern applied to the device.

Past implementations of LCLVs have included devices that are laser addressed, and devices that are photoconductor coupled to a cathode ray tube (CRT) or other light source. Laser-addressed systems, while exhibiting high resolution, are storage devices that may require several seconds to fill the screen, and use generally complex optical systems for both addressing and projection. Photoconductor-coupled devices, in addition to the addressing optics, have used either ultilayer construction to isolate the projection and addressing light, or have severe constraints on the wavelength of the addressing/projection light.

An electron-beam addressed LCLV could, at least conceptually, eliminate prior problems associated with photoconductors and light blocking layers. In addition, such a device could be made sufficiently fast for real-time operation. The most current electron-beam addressed LCLV prior to the present invention is a Tektronix Corp. device described in an article by Duane A. Haven, "Electron-Beam Addressed Liquid-Crystal Light Valve", IEEE Transactions on Electron Devices, Vol. ED-30, No. 5, May 1983, pages 489–492. This article describes an LCLV device in which electrons form a writing gun impinge upon a target electrode, and are subsequently erased from the target by means of flood guns. The flood guns recharge the target electrode to a controlled uniform potential. One problem associated with this device is that flood guns are not uniform, and produce a non-uniform distribution of electrons on the target electrode. This in turn produces an image that is not uniform. Image retention is another problem. The low energy flood gun is not capable of totally erasing the image created by the deep implant of electrons by the high energy writing gun. The Tektronix device requires the use of an expensive transmissive CRT, and its optically transmissive nature limits the choice of materials that can be used in connection with the LCLV. Some materials which might otherwise be suitable are birefringent and can rotate the polarization of the readout light, and therefore are not suitable. It would also be desirable to increase the sensitivity of the device.

SUMMARY OF THE INVENTION

In view of the above problems associated with the prior art, it is an object of the present invention to provide a novel and improved electron beam addressed LCLV which is simple in construction, has a high resolution display, avoids the need for a flood beam and its attendant image distortion, does not suffer from the image retention problem, and does not require a high transmissive membrane.

Another object of the invention is the provision of such an electron beam addressed LCLV which is less expensive, and yet more sensitive, than prior devices.

These and other objects are accomplished in the present invention by an LCLV which is designed to operate primarily in a reflective mode. A flat, electrically resistive membrane is positioned on the opposite side of a liquid crystal layer from the readout optical beam, with a layer of partially conductive material supported on the membrane and adapted to be addressed by the electron beam. An accumulation of electric charge at any location in the partially conductive material, due to the impinging electron beam, produces a voltage across a corresponding location in the liquid crystal. The liquid crystal voltage controls its light transmitting or polarization rotation characteristics as desired. A charge collection means, preferably in the form of a conductive matrix grid, is disposed on the partially conductive layer to collect charge received by that layer from electron beam scanning. The grid divides the partially conductive layer into a series of pixels, with the matrix material surrounding each pixel on the electron beam side of the partially conductive layer. A voltage of one polarity is induced across the corresponding location of the liquid crystal layer in response to the electron beam impinging upon a pixel in the partially conductive layer. Charge then dissipates from the pixel into the surrounding grid at a rate which is fast enough to substantially discharge the pixel during the interval between electron beam scans, but is slow enough to produce an image for a readout optical beam. A circuit means is connected to dissipate the charge received by the conductive matrix from the partially conductive layer. The resistances and capacitances of the liquid crystal layer, the membrane and the partially conductive layer are selected to produce a substantially AC voltage across the liquid crystal during the conductive layer discharge following each electron beam scan. The pixels are thus automatically erased without the need for flood guns.

In the preferred embodiment a mirror is disposed on the opposite side of the liquid crystal layer from the readout beam, and reflects the readout beam back through the liquid crystal. A transparent electrode is provided on the readout beam side of the liquid crystal, and is connected to provide a voltage reference for the liquid crystal. The conductive matrix and transparent electrode may either be grounded, or connected by means of an AC power supply which improves the liquid crystal sensitivity.

Other features and advantages of the invention will be apparent to those skilled in the art from the following detailed description of preferred embodiments, taken together with the accompanying drawings, in which:

DETAILED DESCRIPTION OF PREFERRED EMBODIMENTS

Figure 1:
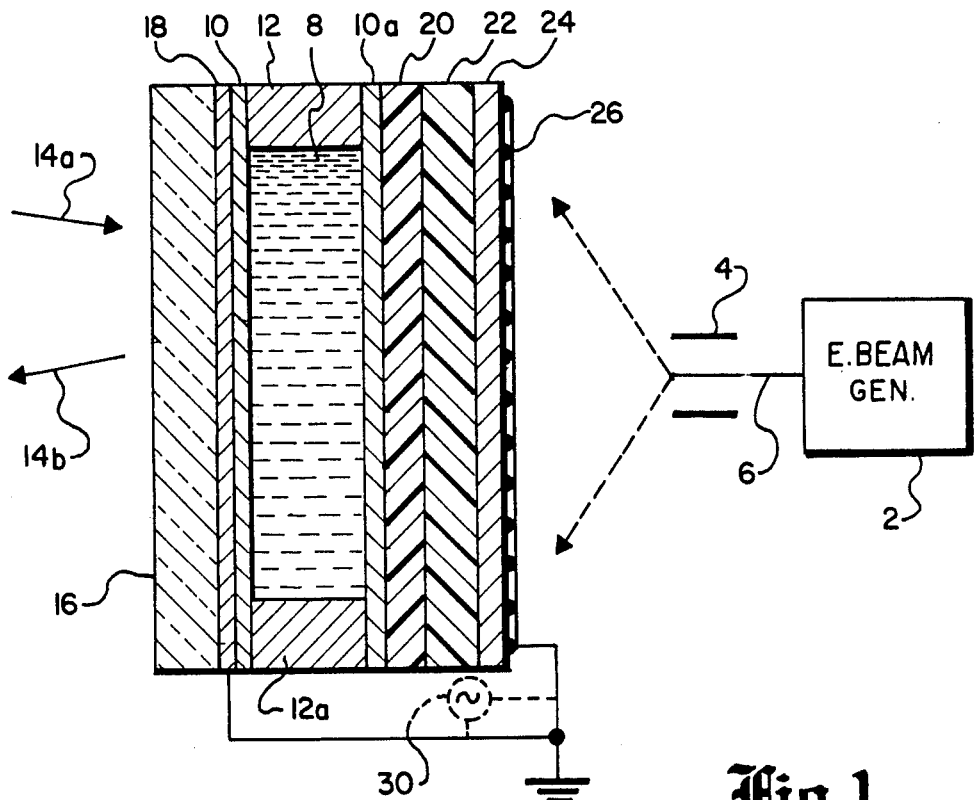
FIG. 1 is a sectional view of an electron beam addressed LCLV constructed in accordance with the present invention.

Referring to FIG. 1, a modified form of an LCLV is shown which provides a high resolution display of an electron beam scan pattern. A CRT is represented as an electron beam generator 2 and a pair of deflection plates 4 which cause the beam 6 to scan in a raster pattern. An additional pair of plates would also be provided to control the beam scan into and out of the page. The beam current is typically in the approximate range of 10 microamps to 1 milliamp.

The LCLV includes a layer of liquid crystal 8 which is enclosed in a cell formed by insulating films 10 and 10a on either side to facilitate the liquid crystal alignment and to provide chemical isolation, and spacers 12 and 12a which maintain a suitable gap between insulating films 10 and 10a and prevent liquid crystal 8 from escaping.

The left side of the LCLV is referred to as the "readout" side, since an optical readout beam 14a is directed onto the valve from this side and is reflected as an output beam 14b after it has been modulated in accordance with the electron beam pattern. A transparent cover plate 16, preferably made form glass, covers and protects the left hand side of the device. A transparent electrode 18, preferably formed from tinindium oxide, is coated on the inner face of cover plate 16. This electrode provides a reference for the voltage established across the liquid crystal, as described below.

A mirror 20 is provided on the opposite side of the liquid crystal cell from the readout beam. This mirror receives the readout beam, and reflects it back again through the liquid crystal. It can be implemented with a conventional wide band, high reflectivity dielectric mirror. This is in contrast to many light valves, which employ a photoconductive layer; these require the mirror to have a modified dielectric, since the mirror is required to absorb almost all of the readout light which is not reflected so as to avoid rendering the photoconductive layer conductive. The present light valve, however, does not employ a photoconductive layer, and therefore the mirror can be much simpler. Instead of the dielectric mirror, a metal matrix mirror such as that disclosed in Ser. No. 759,004, assigned to Hughes Aircraft Company, the assignee of the present invention, may also be employed.

A support membrane 22 is positioned on the electron beam side of mirror 20, and supports both the mirror and a layer of partially conductive material 24. The membrane should be resistive so as to avoid shorting the deposited charge image, with a high sheet resistivity in the order of $10^{12}$ ohms/sq. or greater. It is either rigid, or stretchable so that it can be formed with a very flat surface plane; an outer ring (not shown) may be provided as a base for stretching the membrane. Suitable membrane materials are Kepton, mica and boron nitride. To protect it from possible electron damage, the membrane might incorporate a thin layer of $SiO_2$ or other resistive material 24 evaporated onto its electron beam side.

Figure 2:
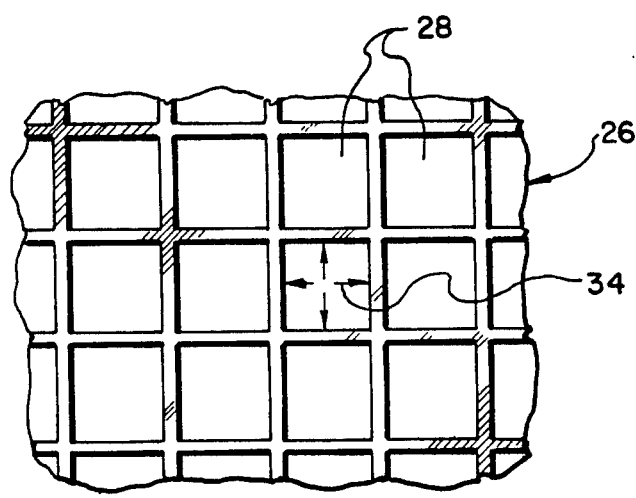
FIG. 2 is a fragmentary elevation view of a portion of the conductive matrix used to dissipate charge received from the electron beam.

A matrix of conductive material 26, preferably in the form of a metallic grid as illustrated in FIG. 2, is deposited on the outer face of the partially conductive layer 24. Each of the grid openings 28 defines a pixel for purposes of foaming an image from the scanning electron beam. The grid 26 and the electrode 18 are connected together to ground, or, in another embodiment, an AC voltage source 30 may be connected between these two elements as described below. The dimensions of the grid and underlying partially conductive layer, and the conductivity of the partially conductive layer, are selected so that electrons absorbed within each pixel of the partially conductive layer during a particular scan will leak out through the grid by the time the electron beam has finished a scanning cycle and returned to that pixel. For a television scan rate 30-60 Hz, the leakage rate should be fast enough to dissipate the pixel in the approximately 17-30 milliseconds between scans. However, the dissipation through the partially conductive layer should be slow enough so that an image is left for the readout beam 14a to observe. The bulk resistance of the partially conductive layer is preferably within the range of about $10^{10}$–$10^{13}$ ohms per square and its thickness is preferably about 3-10 microns; the resistivity may be in the order of $10^7$–$10^{10}$ ohm cm. Suitable partially conductive materials include silicon dioxide and cryolite; cadmium telluride may be acceptable in some applications, but for others it may be too conductive. Typical pixel sizes are 0.01-0.15 mm. per side.

The electron charge absorbed into any particular pixel of the partially conductive layer 24 as a result of the electron beam scan produces a voltage across a corresponding location of the liquid crystal. Since the various elements of the light valve have a high resistance to lateral spreading, an essentially 1:1 correspondence can be achieved between the individual pixel areas of the partially conductive layer which receive electron charges, and corresponding areas of the liquid crystal which support a voltage determined by the absorbed charge. To avoid an excessive voltage drop across the membrane at the expense of the liquid crystal voltage, the membrane should be made very thin, in the order of about 4-12 microns.

Figure 3:
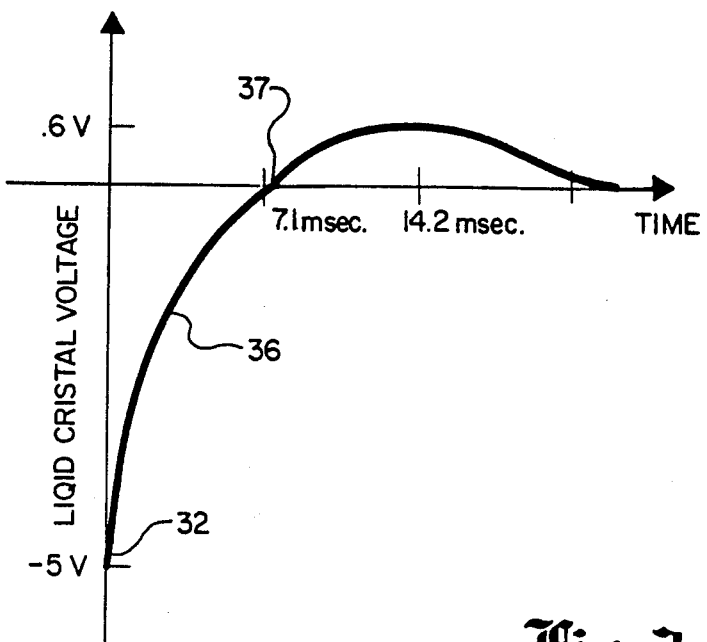
FIG. 3 is a graph illustrating the time-based voltage signal established at a particular liquid crystal pixel location in response to an electron beam.

If one of the layer in the sandwich, for instance the mirror or the membrane or both, is a good insulator, the pixel voltages established across the liquid crystal from an electron beam scan will be AC rather than DC. An AC operation is a distinct advantage, since liquid crystal tends to decompose under sustained DC operation. The liquid crystal polarization shift responds to the RMS voltage level, so that an AC voltage may be used to establish the polarization shift without the decomposition effects of DC operation. The AC voltage effect on the liquid crystal an electron beam scanning a pixel on the partially conductive layer is illustrated in FIG. 3, in which the liquid crystal voltage at the pixel location is plotted against time. The beam scans across the crystal in a very short period of time, rapidly depositing electrons which produce a negative voltage peak 32 across the liquid crystal. The electron beam will typically deposit charge onto a pixel in the order of 30 nsec. After the beam has passed, the electrons absorbed into the pixel will begin to flow back out to the right towards the metallic grid 26. The conductive grid material surrounding each grid opening 28 (FIG. 2) will attract the excess electrons within the surrounded partially conductive layer pixel; these electrons are dissipated to ground. The outflow of electrons form the partially conductive layer 24 into the conductive grid is illustrated by electron flow lines 34 for one pixel in FIG. 2. AC power supply 30 can be used to bias the liquid crystal to a voltage near its threshold voltage, so as to improve its sensitivity.

Returning to FIG. 3, after the electron beam has passed the pixel and a maximum negative voltage produced across the liquid crystal, the liquid crystal voltage gradually decays along line 36. As electrons from the partially conductive layer 24 continue to flow out to the grid 26 in the opposite direction to the original beam electrons, the liquid crystal voltage becomes positive, crossing the zero voltage axis at point 38. It thereafter reaches a positive voltage peak, which is significantly less than the initial negative voltage peak, and decays to zero as the excess charge in the partially conductive layer dissipates.

If at least one of the light valve layers is a good insulator, the area under the negative portion of the liquid crystal voltage curve will generally be equal to the area under the positive portion of the curve. The voltage decays back essentially to zero during the interval between successive electron beam scans, resulting in an AC liquid crystal voltage characteristic over the course of repeated beam scans. This avoids the deterioration problem associated with DC operation, which was discussed above. On the other hand, the voltage decay is slow enough so that the liquid crystal has enough time to respond and produce the desired image.

Figure 4:
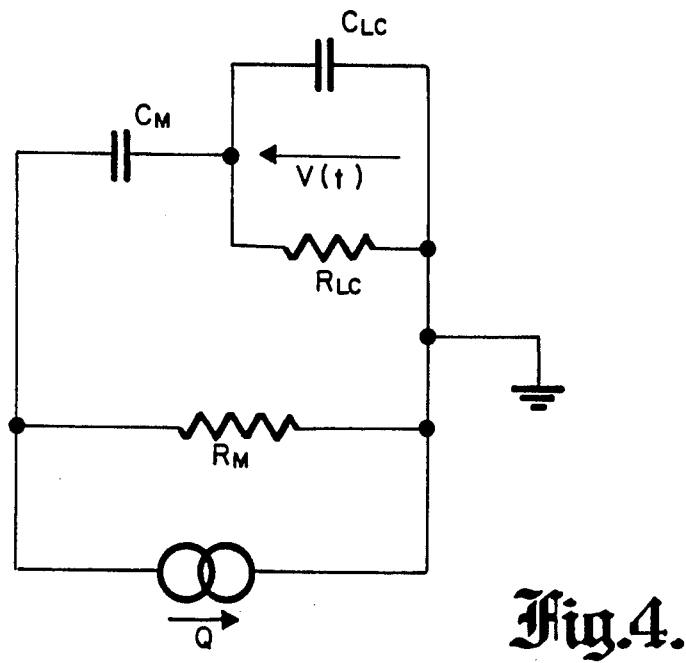
FIG. 4 is an equivalent circuit of the LCLV elements governing the charge dissipation.

An equivalent circuit for the charge dissipation from the partially conductive layer is illustrated in FIG. 4. V(t) represents the voltage at the liquid crystal/membrane interface resulting from the charge Q deposited in a particular pixel by the electron beam. $R_{LC}$ and $C_{LC}$ are respectively the resistance and capacitance of the liquid crystal, $C_M$ is the combined parallel capacitance of the membrane and partially conductive layer, and $R_M$ is the combined parallel effective sheet resistivity of the membrane and partially conductive layer, all for one pixel element. The membrane and partially conductive layer capacitances are generally of the same order of magnitude, whereas the membrane sheet resistivity is generally much greater than that of the partially conductive layer. Therefore, the membrane and partially conductive layer capacitances will each materially contribute to $C_M$, while the membrane resistivity can generally be ignored. The charge deposited by the electron beam can flow out to the grid potential either directly through the partially conductive layer, or through a parallel path consisting of the bulk of the membrane and liquid crystal to electrode 18. The expression for the liquid crystal current resulting from V(t) can be shown to be:

$$I_{LC} = \frac{Q}{\tau_{LC}} \cdot \frac{1}{S_1 - S_2} (S_1 e^{S_1 t} - S_2 e^{S_2 t})$$

where $S_{1,2} =$ $$\frac{-1}{2\tau_M \tau_{LC}} (\tau_M + \tau_{LC} + \tau \mp \sqrt{(\tau_M + \tau_{LC} + \tau)^2 - 4\tau_M \tau_{LC}})$$

$$\tau_M = R_M C_M, \tau_{LC} = C_{LC} R_{LC}, \tau = R_{LC} C_M$$

An AC voltage curve such as that shown in FIG. 3 will result from the following set of values, among others:

$R_{LC} = 6 \times 10^{11}$ ohms
$R_M = 10^{12}$ ohms/sq.
$C_{LC} = 5 \times 10^{-15}$ farads
$C_M = 6 \times 10^{-15}$ farads
$I_{BEAM} = 100$ microamps A very important and novel feature of this arrangement is that, beginning with a basically single polarity electron beam, an AC voltage is produced across the liquid crystal. Another advantage is the achievement of a very high resolution. With an electron beam diameter of 0.025 mm. and a 5 cm. light valve, a 2,000 line system can be attained. The device has a very fast response time, being limited principally only by the liquid crystal. It also has a very simple structure that eliminates the need for fiber optics coupling plates or input imaging lenses used with prior devices. An image is produced with a high degree of uniformity, since each pixel of the partially conductive layer discharges directly into the adjacent conductive grid. It is also considerably more sensitive than the prior Tektronix or similar devices—since the present light valve is reflective rather than transmissive, the readout beam passes through the liquid crystal twice, both before and after reflection. This will permit a thinner liquid crystal layer to be used for the same sensitivity, or conversely will produce a greater sensitivity for the same liquid crystal thickness. Since the liquid crystal response time varies with the square of its thickness, any reduction in thickness will have a very positive effect upon response time.

In fabricating the device shown in FIG. 1, the mirror 20 is deposited onto the membrane 22 in one deposition run, and the partially conductive layer 24 is deposited onto the membrane in a separate deposition run. It would also be possible to reverse the positions of the membrane and mirror, so that the mirror is sandwiched between the membrane and partially conductive layer on the electron beam side of the membrane. this could enable the fabrication of these elements to be accomplished in a single deposition run. The membrane, however, would have to be transparent to permit passage of the readout light beam to the mirror. It might also be possible to remove the mirror entirely, and operate the device in a transmission mode.

Figure 5:
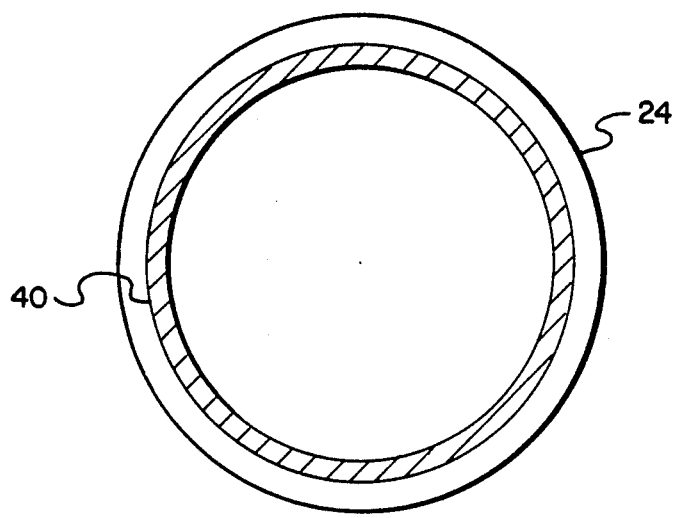
FIG. 5 is an elevation view of the back face of the LCLV which uses a peripheral conductive ring to dissipate signal charge.

In another variation, illustrated in FIG. 5, the grid 26 is replaced by a simple conductive ring 40 around the back face of partially conductive layer 24 to dissipate the signal charge. This results in an even simpler device, at the cost of a somewhat lowered resolution.

Numerous other variations and alternate embodiments will occur to those skilled in the art. Accordingly, it is intended that the invention be limited only in terms of the appended claims.

We claim:
1. A liquid crystal light valve (LCLV) adapted to be addressed by a scanning electron beam, comprising:
a liquid crystal layer adapted to be addressed by a readout optical beam,
a flat electrically resistive membrane supported in proximity to the liquid crystal layer on the opposite side thereof from the readout beam,
a layer of partially conductive material supported by the membrane and adapted to be addressed by the electron beam, the accumulation of electric charge in the partially conductive material from the elec- tron beam producing a voltage across the liquid crystal, means for collecting charge received by the partially conductive layer as a result of electron beam scanning of the layer, and circuit means connected to dissipate charge received by the collecting means from the partially conductive layer, the resistance of at least one of the liquid crystal light valve layers being high enough to produce a substantially AC voltage across the liquid crystal following each electron beam scan.

2. The LCLV of claim 1, wherein the collecting means comprises a conductive matrix disposed on the partially conductive layer and dividing that layer into pixel elements, the conductive matrix being adapted to receive electrical charge from the partially conductive layer pixel elements.

3. The LCLV of claim 2, wherein a transparent electrode is provided on the opposite side of the liquid crystal layer from the partially conductive layer, the electrode being connected to provide a voltage reference for the liquid crystal layer.

4. The LCLV of claim 3, the circuit means comprising a mutual connection between the conductive matrix and transparent electrode.

5. The LCLV of claim 4, wherein the conductive matrix and transparent electrode are grounded.

6. The LCLV of claim 4, the circuit means comprising an AC power supply connected between the conductive matrix and the transparent electrode.

7. The LCLV of claim 1, further comprising a mirror disposed on the opposite side of the liquid crystal layer from the readout beam and adapted to reflect a readout beam received from the liquid crystal layer back through that layer.

8. The LCLV of claim 1, wherein the partially conductive layer has a bulk resistance in the order of about $10^{10}$–$10^{13}$ ohms per square.

9. A liquid crystal light valve (LCLV) adapted to be addressed by a scanning electron beam, comprising:
a liquid crystal layer adapted to be addressed by a readout optical beam,
a layer of partially conductive material supported in proximity to the liquid crystal layer on the opposite side thereof from the electron beam, and adapted to be addressed by the readout beam, the accumulation of electrons in the partially conductive layer from an electron beam scan producing a voltage across the liquid crystal,
a grid of conductive material disposed on the partially conductive layer and adapted to receive electron leakage from the partially conductive layer, the grid dividing the partially conductive layer into a series of pixel elements with grid material surrounding the pixel elements to receive electron leakage therefrom, and
circuit means connected to discharge the grid of electrons leaked from the partially conductive layer,
the dimensions and materials for the various elements being selected, relative to the electron beam scanning rate, to produce an electron leakage rate from the partially conductive layer pixels into the grid that is fast enough to substantially dissipate electrons delivered to the pixels during an electron beam scan prior to the next scan, but slow enough for the liquid crystal to produce an image for a readout beam.

10. The LCLV of claim 9, wherein the partially conductive layer has a bulk resistance in the order of about $10^7$–$10^{10}$ ohms cm.

11. The LCLV of claim 9, wherein a transparent electrode is provided on the opposite side of the liquid crystal layer from the partially conductive layer, the electrode being connected to provide a voltage reference for the liquid crystal layer.

12. The LCLV of claim 11, the circuit means comprising a mutual connection between the conductive grid and transparent electrode.

13. The LCLV of claim 12, wherein the grid and transparent electrodes are grounded.

14. The LCLV of claim 12, the circuit means comprising an AC power supply connected between the grid and the transparent electrode.

15. The LCLV of claim 9, further comprising a mirror disposed on the opposite side of the liquid crystal layer from the readout beam and adapted to reflect a readout beam received from the liquid crystal layer back through that layer.

16. The LCLV of claim 15, wherein the mirror is positioned between the liquid crystal layer and the membrane.

17. A liquid crystal light valve (LCLV) adapted to be addressed by a scanning electron beam, comprising:
a liquid crystal layer adapted to be addressed by a readout optical beam,
a flat, electrically resistive membrane supported in proximity to the liquid crystal layer on the opposite side thereof from the readout beam,
a layer of partially conductive material supported by the membrane and adapted to be addressed by the electron beam,
a conductive grid disposed on the partially conductive layer and dividing that layer into pixel elements, the conductive grid being adapted to receive electrical charge from the partially conductive layer pixel elements, and
circuit means connected to dissipate charge received by the grid from the partially conductive layer as a result of electron beam scanning of the layer,
the accumulation of electric charge in the partially conductive material due to an electron beam scan and the subsequent dissipation of the charge through the grid producing a voltage across the liquie crystal and a related liquid crystal current $I_{LC}$ in the form:

$$I_{LC} = \frac{Q}{\tau_{LC}} \frac{1}{S_1 - S_2}(S_1 e^{S_1 t} - S_2 e^{S_2 t})$$

where $S_{1,2} =$ $$\frac{-1}{2\tau_M \tau_{LC}}(\tau_M + \tau_{LC} + \tau \mp \sqrt{(\tau_M + \tau_{LC} + \tau)^2 - 4\tau_M \tau_{LC}})$$

$$\tau_M = R_M C_M, \; \tau_{LC} = C_{LC} R_{LC} \; \tau = R_{LC} C_M$$

$C_{LC}$ = liquid crystal capacitance per pixel
$R_{LC}$ = liquid crystal resistance per pixel
$C_M$ = combined membrane partially conductive layer capacitance per pixel
$R_M$ = effective combined membrane partially conductive layer sheet resistivity per pixel,
$C_{LC}$, $R_{LC}$, $C_M$ and $R_M$ being selected to produce an AC voltage across the liquid crystal during a substantial portion of the time between the electron beam scans.

18. The LCLV of claim 17, wherein the membrane thickness is in the approximate range of 4–12 microns, the partially conductive layer thickness is in the approximate range of 3–10 microns, the liquid crystal layer thickness is in the approximate range of 1–25 microns, the sides of the pixels are approximately 0.1–1 mm. and the electron beam current is in the approximate range of 10 microamps–1 milliamp.

19. The LCLV of claim 17, wherein the partially conductive layer has a bulk resistance in the order of about $10^7$–$10^{10}$ ohms cm.

* * * * *